United States Patent
Chaintreau et al.

(10) Patent No.: US 8,924,474 B2
(45) Date of Patent: Dec. 30, 2014

(54) DEVICE AND METHOD FOR CONTROLLING DISSEMINATION OF DATA BY TRANSFER OF SETS OF INSTRUCTIONS BETWEEN PEERS HAVING WIRELESS COMMUNICATION CAPACITIES

(75) Inventors: Augustin Chaintreau, Paris (FR); Joshua Reich, West Hempstead, NY (US)

(73) Assignee: Thomson Licensing, Issy les Moulineaux (FR)

( * ) Notice: Subject to any disclaimer, the term of this patent is extended or adjusted under 35 U.S.C. 154(b) by 873 days.

(21) Appl. No.: 12/800,325

(22) Filed: May 13, 2010

(65) Prior Publication Data

US 2010/0293228 A1 Nov. 18, 2010

(30) Foreign Application Priority Data

May 15, 2009 (EP) .................................... 09305444

(51) Int. Cl.
*G06F 15/16* (2006.01)
*H04L 29/08* (2006.01)

(52) U.S. Cl.
CPC .......... *H04L 67/104* (2013.01); *H04L 67/1095* (2013.01); *H04L 67/1076* (2013.01); *H04L 67/04* (2013.01); *H04L 67/34* (2013.01)
USPC ........... 709/204; 709/201; 709/213; 709/246; 726/4

(58) Field of Classification Search
CPC .... H04L 67/04; H04L 67/104; H04L 67/1076
USPC .................................. 709/204, 201, 213, 246
See application file for complete search history.

(56) References Cited

U.S. PATENT DOCUMENTS

| | | | | |
|---|---|---|---|---|
| 8,145,713 | B1 * | 3/2012 | Irwin et al. | 709/205 |
| 8,239,479 | B2 * | 8/2012 | Sagar et al. | 709/217 |
| 8,250,240 | B2 * | 8/2012 | Arakawa et al. | 709/246 |
| 8,407,291 | B1 * | 3/2013 | Irwin et al. | 709/205 |

(Continued)

FOREIGN PATENT DOCUMENTS

GB 2444995 A 6/2008

OTHER PUBLICATIONS

Mor, Marcus, et al., "Using Space-Based Computing for More Efficient Group Coordination and Monitoring in an Event-Based Work Management System", Availability, Reliability and Security, 2007, ARES, The Second International Conference On, IEEE PI, pp. 1116-1123.
European Search Report for EP 09 30 5444 dated Nov. 10, 2009.

*Primary Examiner* — Arvin Eskandarnia
(74) *Attorney, Agent, or Firm* — Tutunjian & Bitetto, P.C.

(57) ABSTRACT

A method is intended for controlling dissemination of data in a peer-to-peer mode between peers having wireless communication capacities. This method consists i) in creating N sets of instructions in a first peer each set being intended to be used for carrying out an action relative to these data and to be deleted after having been used, and ii) when this first peer cannot use locally remaining sets of instructions relative to these data, in transferring at least one of these remaining sets of instructions from this first peer to at least one second peer in order that this remaining set of instructions could possibly be used by this second peer.

15 Claims, 1 Drawing Sheet

(56) References Cited

U.S. PATENT DOCUMENTS

| | | | |
|---|---|---|---|
| 2003/0097444 A1* | 5/2003 | Dutta et al. | 709/225 |
| 2004/0128324 A1* | 7/2004 | Sheynman et al. | 707/200 |
| 2004/0162871 A1 | 8/2004 | Pabla et al. | |
| 2009/0300725 A1* | 12/2009 | Carney | 726/4 |
| 2010/0049846 A1* | 2/2010 | Ballette et al. | 709/224 |
| 2010/0257239 A1* | 10/2010 | Roberts | 709/204 |

* cited by examiner

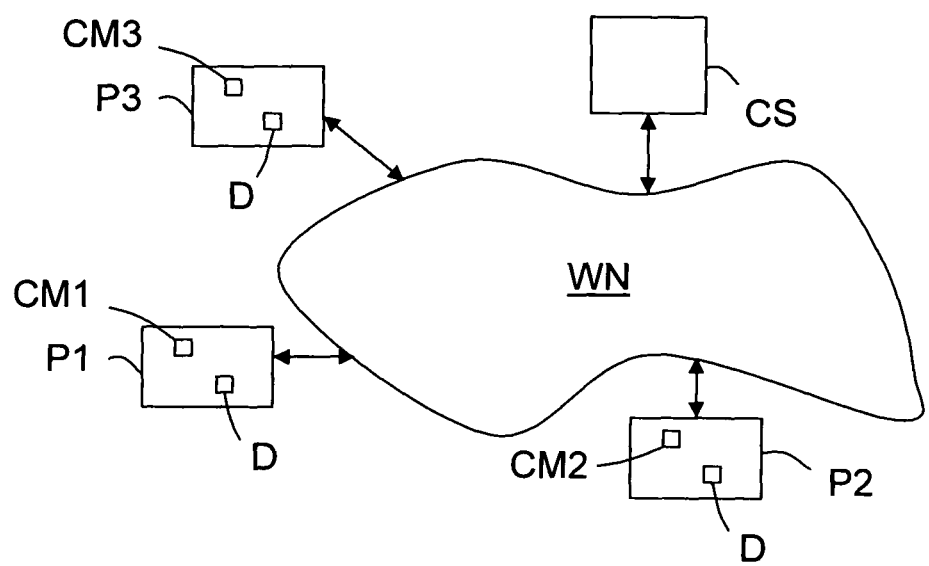

DEVICE AND METHOD FOR CONTROLLING DISSEMINATION OF DATA BY TRANSFER OF SETS OF INSTRUCTIONS BETWEEN PEERS HAVING WIRELESS COMMUNICATION CAPACITIES

This application claims the benefit, under 35 U.S.C. §119 of European Procedure Patent Application 09305444.3, filed May 15, 2009.

BACKGROUND OF THE INVENTION

1. Field of the Invention

The present invention relates to data dissemination between peers in a peer-to-peer (or "P2P") wireless environment.

One means here by "peer" a wireless communication equipment capable of exchanging data (or symbols (i.e. blocks or packets or chunks of data)) with other peers or network equipments in a P2P mode through wireless communications and by means of a distributed adaptive or reactive protocol. So, a peer may be a laptop, a smartphone, a mobile or cellular telephone, a personal digital assistant (PDA), provided that it comprises a wireless communication interface (or any equivalent wireless communication means), or a node associated to a vehicle (for instance a bus or a car) or a base station that is assisting opportunistic data delivery in an area (such as a content "booth" (or a "throwbox")).

Moreover, one means here by "data dissemination" the transmission of data between peers in order each of these peers had these data at its disposal or at the disposal of other peers.

More, one means here by "data" any group or set of digital data that can be disseminated in a P2P mode, and notably contents (such as files of information data, videos, chunks of video, pictures to share, html files, audio files or software updates), and values of parameters or counters.

2. Description of the Prior Art

The number of wireless communication equipments (and notably mobile telephones, smartphones and portable equipments), capable of displaying, storing, transmitting, and more generally using, data, is increasing, and the operators of wireless communication networks are facing a main issue: how to disseminate the data efficiently between wireless communication equipments.

Today, most of the wireless data dissemination applications proceed to content dissemination by means of a direct transmission through a centralized infrastructure. However, this solution is both expensive for the content provider and inefficient from a networking perspective as it leaves unused the potentially very large quantity of bandwidth which is available for data exchange between wireless communication equipments within short range radio transmission (e.g. Bluetooth or IEEE 802.11).

Networks that leverage local connection opportunities to communicate in a delay tolerant manner can be classified into two different categories. A first category comprises networks involving nodes with scheduled or controlled routes and using a routing protocol to communicate critical information in due time. A second category comprises networks to which wireless communication equipments with unpredictable mobility are connected, e.g. because their users are attending a conference or a common event. In the latter case, no protocol can guarantee to deliver a message within a fixed time although the performance of a peer-to-peer application can still be acceptable.

It is recalled that in a P2P environment, communication equipments (or peers) meet according to a simple homogeneous and memoryless process, as if they follow uncoordinated mobility, and have a dedicated buffer (or cache memory) which can be filled with data (such as content items (or files)) that could be requested later by other peers. The demands (or requests) for different data arise according to a stationary regime that can follow an arbitrary popularity distribution. In contrast with traditional fixed P2P networks, in wireless P2P networks the time elapsed between the demand arising and the fulfillment of this demand can be far from negligible. So, this time elapsed (or delay to fulfil a request) plays an important role in the perception of the P2P network by users. Indeed, in some cases it may happen that the interest for data (for instance a content item (or file)) becomes obsolete before the peer has any chance to receive these data.

To reduce the mean time that is necessary to a wireless communication equipment to obtain requested data (such as a content item) in a wireless P2P environment, it has been proposed to implement a distributed replication scheme consisting in creating replications of content items into peers containing these content items, when necessary. But, this replication scheme does not occur instantaneously and requires decoupling of the time when a wireless communication equipment (or node) realizes that an action should be carried out and the time when this node can effectively carry out (or execute) this action.

SUMMARY OF THE INVENTION

So the object of this invention is to provide a method and an associated control device allowing to optimize the fulfillment of cache memories of wireless communication equipments in a wireless P2P environment, in order to best address the demands or requests of data (for instance content items (or files)) of their users.

More precisely, the invention provides a method for controlling dissemination of data in a peer-to-peer mode between peers having wireless communication capacities, and comprising the steps of:
i) creating N sets of instructions for a first peer, each set being intended to be used for carrying out an action relative to these data and to be deleted after having been used, and
ii) when this first peer cannot use locally remaining sets of instructions relative to these data, transferring at least one of these remaining sets of instructions from this first peer to at least one second peer in order that this at least one remaining set of instructions could possibly be used by this second peer.

The method according to the invention may include additional characteristics considered separately or combined, and notably:
- the choice of when N sets of instructions can be created can be specified by a protocol;
- in a first variant, N sets of instructions may be created each time the first peer receives data it had requested from other peer(s);
- in a second variant, N sets of instructions may be created each time the first peer requests data from another peer, even if this other peer and/or the requesting first peer does not possess these data;
- in a third variant, N sets of instructions may be created for the first peer itself in a proactive manner, following the dynamics of a given counter which may depend on the environment and/or a specific program;

in a fourth variant, N sets of instructions may be created each time a subset of the conditions above mentioned in the different variants are satisfied;

when the second peer receives a set of instructions defining an action relative to given data, this received set of instructions may be added to the possible other sets of instructions defining locally the same action relative to the same given data;

each second peer may be chosen by means of at least one heuristic rule;

the heuristic rule may consist in choosing a second peer which is the most likely to quickly execute the action defined by a set of instructions;

in step ii) the considered first peer may transfer a percentage of the remaining sets of instructions, relative to given data, to at least one second peer storing a permanent replication of these given data;

the percentage may be chosen between 50% and 100%;

each set of instructions may define an action which is chosen from a group comprising at least a replication of data, a deletion of data, a replacement of data, a modification of data.

The invention also provides a control device for controlling dissemination of data in a peer-to-peer mode from a first peer associated to the control device to other peers through wireless communications, and arranged:

for creating N sets of instructions for the first peer, each set being intended to be used for carrying out an action relative to these data and to be deleted after having been used, and when the first peer cannot use locally remaining sets of instructions, relative to these data, for ordering the first peer to transfer at least one of these remaining sets of instructions to at least one second peer, in order that this at least one remaining set of instructions could possibly be used by this second peer.

The control device according to the invention may include additional characteristics considered separately or combined, and notably:

it may be arranged for creating N sets of instructions when it is specified by a protocol;

in a first variant, it may be arranged for creating N sets of instructions each time its associated first peer receives data it had requested from other peer(s);

in a second variant, it may be arranged for creating N sets of instructions each time its associated first peer requests data from another peer, even if this other peer and/or its associated peer does not possess these data;

in a third variant, it may be arranged for creating N sets of instructions for its associated first peer in a proactive manner, following the dynamics of a given counter which may depend on the environment and/or a specific program;

in a fourth variant, it may be arranged for creating N sets of instructions each time a subset of the conditions above mentioned in the different variants are satisfied;

it may be arranged, when its associated first peer receives a set of instructions defining an action relative to given data, for adding this received set of instructions to the possible other sets of instructions that may define locally the same action relative to the same given data;

it may be arranged for choosing the second peer by means of at least one heuristic rule;

this heuristic rule may consist in choosing a second peer which is the most likely to quickly execute the action defined by the considered set of instructions;

it may be arranged for ordering its associated first peer to transfer a percentage of the remaining sets of instructions, relative to given data, to at least one second peer storing a permanent replication of these given data.

The invention also provides a peer (or wireless communication equipment) capable of establishing connection(s) with other peers through wireless communications and comprising a control device such as the one above introduced.

BRIEF DESCRIPTION OF THE DRAWINGS

Other features and advantages of the invention will become apparent on examining the detailed specifications and the appended drawing, wherein the unique FIGURE schematically and functionally illustrates three wireless communication equipments (or peers) connected to a wireless communication network and each comprising an example of embodiment of a control device according to the invention.

DESCRIPTION OF THE PREFERRED EMBODIMENTS

The appended drawing may serve not only to complete the invention, but also to contribute to its definition, if need be.

The invention aims at offering a method and an associated control device D allowing to control P2P dissemination of data between peers Pj (here, j=1 to 3), connected therebetween through wireless communications, by means of a distributed adaptive or reactive protocol.

For instance these wireless communications are established via a wireless communication network WN. In the following description it will be considered that the wireless communication network WN is an IEEE 802.11 network (i.e. a WLAN (Wireless Local Area Network), for instance of the WiFi type). But the invention is not limited to this type of wireless communication network. Indeed, a wireless communication network may also be a mobile or cellular network, a Zygbee network, an Ultra Wide Band network, an IEEE 802.15 network, or a Bluetooth network, for instance.

Moreover, in the following description it will be considered that peers Pj are mobile telephones. But the invention is not limited to this type of wireless communication equipment. Indeed, the invention concerns any type of wireless communication equipment comprising at least one executable P2P communication application and capable of exchanging data (or symbols) with other wireless communication equipments or network equipments in a P2P mode through wireless communications. So, a peer may be also a laptop, a smartphone, a personal digital assistant (PDA), provided that it comprises a wireless communication interface (or any equivalent wireless communication means), or a node associated to a vehicle (for instance a bus or a car) or a base station that is assisting opportunistic data delivery in an area (such as a content "booth" (or a "throwbox")).

More, in the following description it will be considered that the data to be disseminated are videos. But the invention is neither limited to this type of content nor to contents. Indeed, the invention concerns any type of data which can be disseminated in a P2P mode, and notably contents, such as files of information data, videos, chunks of video, pictures to share, html files, audio files or software updates, and values of parameters or counters (which can evolve from peer to peer, possibly due to the local context (for instance it may be a parameter representative of a popularity estimation)).

As illustrated in the unique FIGURE, data (here contents) may be initially provided to some of the peers Pj, through the (wireless communication) network WN, by a content server CS which is connected or accessible to said network WN.

The invention concerns a group of at least two peers Pj (here mobile telephones). In the illustrated and non limiting example the group comprises three peers P1 to P3 (j=1 to 3). But the invention concerns any group comprising at least two peers capable of exchanging data therebetween. It is important to note that each peer Pj comprises a cache memory (or buffer) CMj in which it stores contents (here videos) received from other peers Pj' (j'≠j) or from the content server CS, in order of arrival. When the cache memory (or buffer) CMj of a peer Pj is full and that this peer Pj receives a content item (or piece of content), the oldest content item it contains is replaced with this received content item.

Moreover, when a peer Pj wants to obtain a content, it generates a dedicated request or demand containing an identifier of this requested content and transmits this dedicated request to one or more other peers Pj' (j'≠j), eventually selected.

As mentioned before the invention offers notably a method intended for controlling dissemination of data (here contents) in a peer-to-peer (P2P) mode between peers Pj. This method comprises two main steps which can be implemented by control devices D according to the invention, which are respectively associated to peers Pj, i.e. which are each dedicated to the control of data dissemination of one associated peer Pj.

As it is schematically illustrated in the unique FIGURE, each (control) device D may be located into its associated peer Pj. But each device D could be also an equipment or element coupled to its associated peer Pj.

So, a device D can be made of software modules, at least partly, or of electronic circuit(s) or hardware modules, or else of a combination of hardware and software modules (in this case the device D comprises also a software interface allowing interworking between the hardware and software modules).

A first main step (i) of the method consists in creating N sets of instructions (or "mandates") for a peer Pj, each set of instructions (or mandate) being intended for being used for carrying out an action which is relative to the received content and for being deleted after having been used.

Any type of action can be defined by a set of instructions (or mandate). So, it can be a replication of data (here a replication of a content intended for another peer Pj'), a deletion of data (here a local deletion of a content stored by peer Pj), a replacement of data (here a local replacement of a content stored by peer Pj with another content), or a modification of data (for instance an increment by one or a decrement by one of the value of a parameter or a counter (for instance a counter whose current value represents the number of replications of a given content to be deleted in peers of the network).

A replication of a content is created by a peer Pj by means of the associated set of instructions (or mandate) when this peer Pj meets another peer Pj' which does not yet possess this content. So a peer Pj (for instance P1) can generate a replication of a content if three conditions are satisfied: (1) it stores this content in its cache memory CMj, (2) it still remains locally one mandate associated to this content, and (3) the peer P1 is currently meeting another peer Pj' (for instance P3) that does not possess this content. If these three conditions are satisfied peer P1 transmits the generated replication to the other peer P3.

Such a replication may be generated either on request of the other peer Pj', or automatically just because peer P1 has discovered that the other peer Pj' was not storing the content in its cache memory CMj' and even if the other peer Pj' has not requested this content.

Once a peer Pj has generated a replication of content by means of the associated mandate, it deletes this mandate.

When the other peer Pj' receives the replication of a content, it stores it into its cache memory CMj'. If the latter (CMj') is full the other peer Pj' preferably replaces the oldest content of its cache memory CMj' with the received replication. Some contents may be permanent (or "sticky") and therefore cannot be deleted. Such permanent contents can be contents which are initially provided by the content server CS, for instance.

It is important to note that the choice of when N sets of instructions must be created for a peer Pj may depend on one or more conditions. For instance, it may be specified by a protocol (implemented into the network WN) and/or it may occur each time a peer Pj receives data it had requested from other peer(s) Pj' (j'≠j) or from the content server CS and/or it may occur each time a peer Pj requests data from another peer Pj', even if this other peer Pj' and/or the requesting peer Pj does not possess these data and/or it may occur in a proactive manner (by or for a peer Pj) following the dynamics of a given counter which may depend on the environment and/or a specific program.

A first main step (i) can be implemented by means of the device D which is associated to a peer Pj. More precisely, the device D of a peer Pj is arranged, each time the latter (Pj) receives a requested content, for creating locally N mandates, each defining the same action relative to this received requested content.

A second main step (ii) of the method is implemented when a peer Pj is no more capable of using locally remaining set(s) of instructions (or mandate(s)) that are relative to given data. Such a case may occur when a peer Pj has deleted a given content into its cache memory CMj while it still remains locally one or several mandates associated to this given content, for instance. Another case may also occur when a peer Pj meets only a small number of peers Pj' and has already replicated the content in all of them. In such a case, the peer Pj is not able to use its remaining replication mandates.

In this case, the concerned peer Pj transfers at least one of the remaining sets of instructions to at least one chosen other peer Pj' in order that this remaining set of instructions could possibly be used by this other peer Pj'. This is to avoid that some mandates are never used, which would cancel the action. This could for instance bias the allocation of contents to cache memory too much in favour of popular items.

A second main step (ii) can be implemented by means of the device D which is associated to a peer Pj. More precisely, the device D of a peer Pj is arranged, each time the latter (Pj) cannot use locally remaining mandate(s) relative to a given content, for ordering its associated peer Pj to transfer at least one of these remaining mandates to at least one chosen other peer Pj'.

When a peer Pj receives a mandate, defining an action relative to a given content (or data), its associated device D may be arranged for adding this received mandate to the possible other mandates that are defining locally the same action relative to the same given content (or data). So it may happen that a peer Pj be temporarily in a position to carry out more than N times the same action onto the same content (or data) because it possesses more than N mandates defining this action for this content, after having received one or several of them from at least one other peer Pj'.

Ideally, one would aim at having peers Pj exchanging mandates at each meeting so as to ensure that mandates asymptotically spend much of their existence located at peers possessing matching replications. As simply spreading mandates evenly around the P2P environment will not better ensure the last condition than leaving mandates at their peer of origin, one must proceed differently.

For instance it is possible to implement in each peer Pj a parameterizable low-complexity mandate routing protocol. To this effect the device D associated to a peer Pj may be arranged for choosing each other peer Pj' by means of at least one heuristic rule. Such a heuristic rule may consist in choosing a peer Pj' which is the most likely to quickly execute the action which is defined by a mandate. For instance, the heuristic rule may state that, whenever a peer is met and possess a copy of a given content, then it should receive in priority the remaining mandates for this content. As another example, a peer may monitor that it meets a lot of other peers which do not have a particular content. In such a case, another heuristic rule implemented by peers could be that, when two peers met, the one that meets the highest number of peers that do not possess a particular content receives the current replication mandate for this content in priority.

In a variant, the device D may be arranged for ordering its associated peer Pj to transfer a chosen percentage of the remaining mandates, relative to a given content, to at least one chosen other peer Pj' which stores a permanent (or sticky) replication of this given content (these peers Pj' guarantee that the replication will not be overwritten (or deleted) before the corresponding mandates can be locally used). In this case, each time a peer Pj meets another peer Pj' storing a permanent replication of the concerned content, it transfers automatically at least one mandate to this other peer Pj' if this is in agreement with the chosen percentage, otherwise (i.e. if the percentage of mandates transferred to peers Pj' storing the concerned permanent replication exceeds the chosen percentage) peer Pj must wait to meet a peer Pj' storing the concerned non permanent replication to transfer the concerned remaining mandate.

Setting the percentage equal to 100% ensures that mandates residing at peers Pj meeting another peer Pj' with the permanent replication will be transferred to this other peer Pj' and will remain with it or in another peer Pj" possessing the same permanent replication until execution. In most cases this should be sufficient to resolve pathology that the mandate routing protocol (or scheme) is designed to address. However in certain situations, it may result in a build-up of mandates at these peers (e.g., if the number of new mandates arriving at a peer with a permanent replication exceeds the rate at which this peer meets other peers). By setting the percentage between 50% and 100%, this allows to avoid most of the above mentioned situations. So, the percentage may be chosen equal to 75%, for instance.

The invention shows several advantages, and notably:
it allows to compensate for the presence of delay that are induced by the replication algorithms of the state of the art and which are skewing the convergence,
it does not require any additional modification to the protocols and allows to run in a distributed manner.

The invention is not limited to the embodiments of method, control device and peer (or wireless communication equipment) described above, only as examples, but it encompasses all alternative embodiments which may be considered by one skilled in the art within the scope of the claims hereafter.

The invention claimed is:

1. A method for transmitting data, the method comprising the steps of:
controlling transmission of data between a plurality of peers having wireless communication capacities such that each of said plurality of peers has the data at its disposal or at the disposal of other peers within said plurality of peers, said controlling further comprising:
i) creating N sets of instructions for a first peer, each set being intended to be used for carrying out an action relative to said data and to be deleted after having been used, and
ii) when said first peer cannot use locally remaining sets of instructions relative to said data, transferring at least one of said remaining sets of instructions from said first peer to at least one second peer in order that said at least one remaining set of instructions could possibly be used by said second peer.

2. The method according to claim 1, wherein N sets of instructions are created:
when specified by a protocol; or
each time said first peer receives data it had requested from at least one second peer; or
each time said first peer requests data from the at least one second peer, even the at least one second peer or said requesting first peer does not possess these data; or
in a proactive manner for said first peer following dynamics of a given counter which may depend on an environment or a specific program.

3. The method according to claim 1, wherein when said at least one second peer receives a set of instructions defining an action relative to given data, said received set of instructions is added to possible other sets of instructions defining locally a same action relative to same given data.

4. The method according to claim 1, wherein said at least one second peer is chosen by means of at least one heuristic rule.

5. The method according to claim 4, wherein said heuristic rule consists in choosing said at least one second peer as a peer which is most likely to quickly execute the action defined by said set of instructions.

6. The method according to claim 1, wherein in step ii) said first peer transfers a percentage of the remaining sets of instructions, relative to given data, to the at least one second peer storing a permanent replication of said given data.

7. The method according to claim 1, wherein each set of instructions defines an action, said action comprising at least one of a replication of data, a deletion of data, a replacement of data, and modification of data.

8. An apparatus for controlling transmission of data, the apparatus comprising:
a control device configured to control the transmission of data between a plurality of peers having wireless communication capacities such that each of said plurality of peers has the data at its disposal or at the disposal of other peers within said plurality of peers, the control device being associated to a first peer from the plurality of peers and comprising a memory module configured to:
i) create N sets of instructions for said first peer, each set being intended to be used for carrying out an action relative to said data and to be deleted after having been used, and
ii) order said first peer to transfer at least one of said remaining sets of instructions to at least one second peer such that the at least one remaining set of instructions could possibly be used by said second peer, wherein said order is performed by said module when the first peer cannot use locally remaining sets of instructions relative to said data.

9. The control device according to claim 8, wherein said memory module for creating N sets of instructions is further configured to create said instructions:

when specified by a protocol; or each time said first peer receives data it had requested from the at least one second peer; and each time said first peer requests data from the at least one second peer, even if this at least one second peer or said first peer does not possess the requested data; and in a proactive manner for its associated first peer following the dynamics of a given counter which may depend on an environment and a specific program.

10. The control device according to claim 8, wherein, when the first peer receives a set of instructions defining an action relative to given data, the memory module is further configured to add said received set of instructions to the possible other sets of instructions that are defining locally the same action relative to the same given data.

11. The control device according to claim 8, wherein said memory module is further configured to choose said at least one second peer by means of at least one heuristic rule.

12. The control device according to claim 11, wherein said heuristic rule consists in choosing said at least one second peer as a peer which is most likely to quickly execute the action defined by said set of instructions.

13. The control device according to claim 8, wherein said memory module is further configured to order the first peer to transfer a percentage of the remaining sets of instructions, relative to given data, to the at least one second peer storing a permanent replication of said given data.

14. The control device according to claim 8, wherein each set of instructions defines an action, said action comprising at least one of a replication of data, a deletion of data, a replacement of data, and a modification of data.

15. A peer device capable of establishing wireless communications with other peer devices, wherein the peer device comprises the control device according to claim 8.

* * * * *